UNITED STATES PATENT OFFICE.

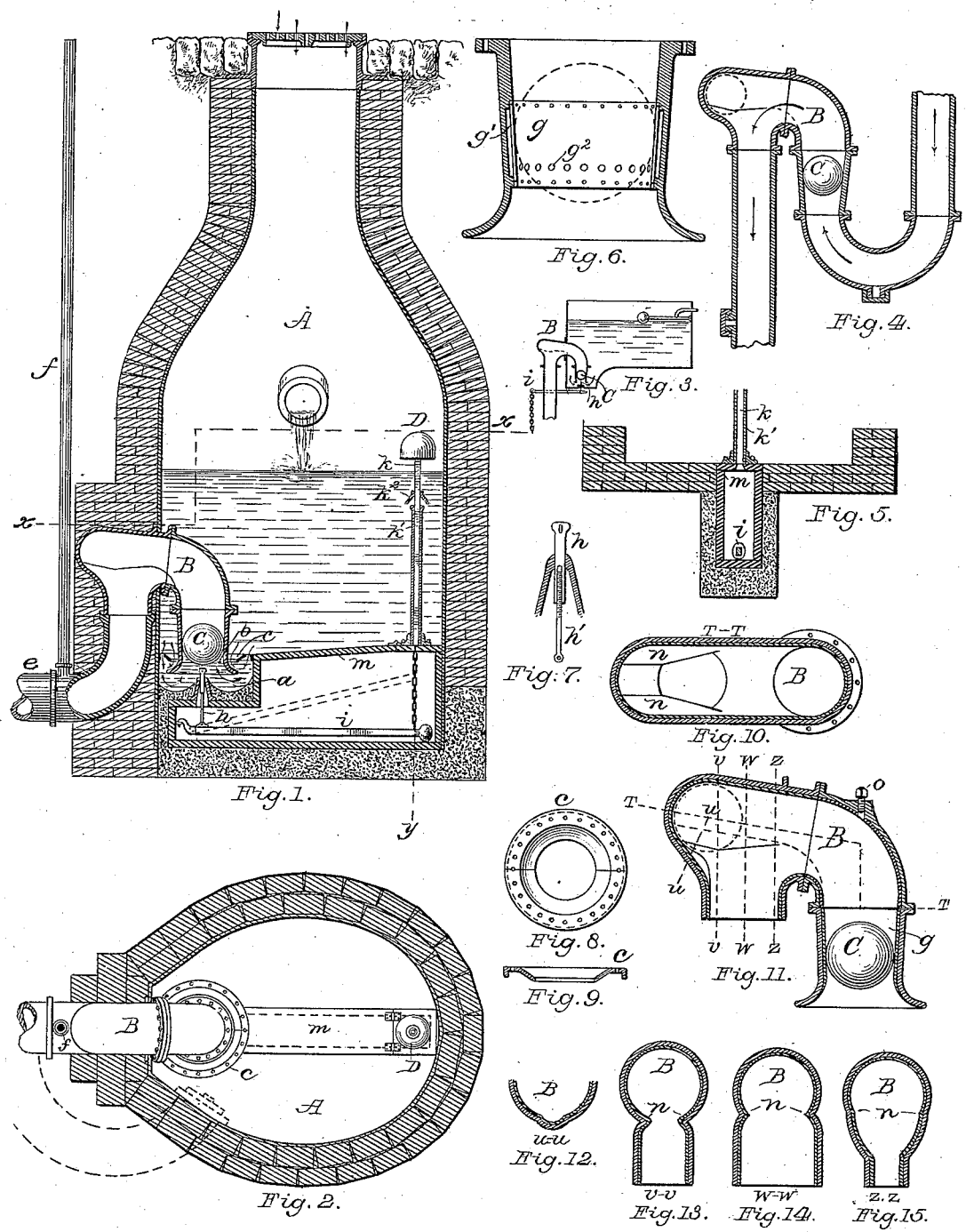

HARVEY C. LOWRIE, OF DENVER, COLORADO.

FLUSHING-SIPHON.

SPECIFICATION forming part of Letters Patent No. 310,529, dated January 6, 1885.

Application filed April 12, 1884. (No model.)

*To all whom it may concern:*

Be it known that I, HARVEY C. LOWRIE, of Denver, in the county of Arapahoe and State of Colorado, have invented certain new and useful Improvements in Flushing-Siphons; and I do hereby declare that the following specification, taken in connection with the drawings furnished and forming a part of the same, is a true, clear, and complete description of the several features of my invention.

My said improvements relate to that class of siphons in whose use there is sought to be accumulated or retained a hydrostatic head or pressure of water or other fluid confined in a pipe or reservoir practically impermeable for the escape of such water or other fluid except through the siphon, and so retained that water cannot enter the siphon until it has accumulated in sufficient quantity and force when released to fill the siphon, drive the air out of it, and effect complete siphonage.

My siphonage apparatus is applicable in all cases where it is desirable to collect slowly and to discharge rapidly, with flushing action, water or other liquids in variable quantities; also where it may be deemed desirable to employ any valve or gate which will open and afford a free or unobstructed passage to fluids under a set or predetermined hydrostatic pressure in one of two diametrically-opposite directions, and which will nevertheless thereafter continue to afford an equally free passage to said fluids under lesser pressure, but which, after the cessation of pressure thereon by said flowing fluids, will automatically firmly close, and which will, until again opened by said predetermined pressure, oppose with impermeable resistance the rearward passage of animal life, liquids, or solid matter, air, gas, or steam.

Whether clean water or sewage containing solid matters be relied upon for flushing, I make my siphon and its pipes of ample internal dimensions and so organize them that the liquid-supply to be reserved for flushing can be accumulated in large or small quantities as slowly or rapidly or as regularly or irregularly as may be desired or convenient in each case, and also so that the liquids may be caused to rise to any desired height (after passing the line at which ordinary siphonage would be effected) for enabling said liquid-supply to acquire the pressure requisite for causing the siphon to open and the flushing operation to begin. It is obvious that all this can best be accomplished in the use of a siphon which approaches as nearly as possible the primary form of a bent tube, whose capacity throughout, being made equal for the work intended, shall be limited as little as possible (by the method employed to prevent entrance into it of the water or other fluid to be used until such time as the desired reserve has accumulated) after such entrance has been made and siphonage has begun.

In the development of my apparatus I have sought in the design such simplicity that its manufacture will be comparatively cheap, and its maintenance and operation will be effective, economical, and lasting. In the accomplishment of these and other ends I employ a siphon and ball in an entirely novel manner, so that for the first time, as I believe, a ball operating within the short leg of a siphon serves as a valve for resisting the entrance of liquid to the siphon until a requisite head or pressure to insure siphonage is obtained, whereupon thereafter said ball when released is lifted and carried to a point in the siphon at which it cannot operate obstructively to the passage of liquids and other matters suspended in or carried thereby; nor can it drop into the long leg of the siphon and pass away; but after siphonage ceases the said ball rolls and drops to its normal position, and operates not only as a water-tight valve capable of the required resistance, but also as a gas-tight valve for preventing sewer-gas from passing through the siphon after each flushing operation, and before the air, gas, or vapor driven out of the outlet to said siphon by the outgoing flush can possibly pass back into or through it. In the development of my invention I have devised various novel combinations and features in construction, which after a full description will be specified in detail in the several claims hereunto annexed.

Referring to the drawings, Figure 1 is a vertical central section of a vertical sewer-shaft or cesspool and a siphon embodying my invention. Fig. 2 is a top view of the lower portion of said shaft below the line $x$, Fig. 1. Fig. 3 is a vertical central section of a closet flush-tank with my siphon attached as for use in buildings. Fig. 4 is a vertical central section of my siphon as applied to the soil-pipe of a building. Fig. 5 is a vertical cross-section of the lower portion of the shaft, Fig. 1, on line $y$. Fig. 6 is an enlarged vertical central section of the mouth of my siphon, and Fig. 7 is an enlarged view of a sliding rod and its bearing located beneath the short leg of the siphon. Figs. 8 and 9 illustrate on an enlarged scale in top view and section an annular plate surmounting the basin in which the mouth of my siphon is located. Figs. 10 to 15, inclusive, are various sectional views of the siphon and portions thereof.

Referring to Fig. 1, it is to be understood that the shaft A may be supplied wholly with water from adjacent water-pipes from time to time, or, whether it be supplied with pipes for that purpose or not, it may be entered by one or more sewer-pipes or by numerous local house-drains, or both, and that such reservoirs may be at the heads of lines of sewers, or be located in series in a main line of sewers at successively lower levels, so that the contents of the reservoirs will be successively discharged into others after traversing a line of sewer, or so that each shaft or reservoir will only receive from local sources and discharge into an adjacent sewer or cesspool, and that one or more similar smaller reservoirs may be employed between the foot of a house-drain and a sewer or cesspool when sufficient fall therefor is afforded. It will readily be seen that in the use of a siphon so constructed and applied when the ball is wedged a slow or rapid accumulation of water or other fluid, so confined as to rise above the level of the highest portion of the siphon, and in contact with the lower surface of the ball, will exert in proportion to its height a hydrostatic pressure upward upon the ball. When at length the upward pressure upon the ball overcomes the compressive force and friction with which it has been held, the ball starts. It is carried rapidly to the top of the siphon, where the rapid passage of the water or other fluid through the siphon easily holds it, washes and turns it about, thereby preventing the attachment to it or the lodgment above it of foreign matter, until finally upon the cessation of all flow and the breaking of the seal of the siphon its contents fall rapidly away, no obstacle remains to the passage of the ball, it rolls and drops freely into the shorter leg and wedges.

In the use of a reservoir or cesspool, as shown in Fig. 1, or in a privy-vault where grease, fecal matter, paper, rags, parings, &c., may be expected, I provide a bottom to the shaft or reservoir, Fig. 1, inclined so that the fluid contents drain readily to the mouth of the circular basin $a$ at and below the bottom of the shaft. The sides and bottom of the basin are curved so as to form a central cone extending up a short distance within the mouth $b$ of the siphon B, which is flared outwardly, and is located within said basin below an annular plate, $c$, which serves as the top of the basin and inclines downwardly toward the cone, and serves as a partial cover for said basin. The outgoing flush, passing over and then under the annular plate $c$, and thence into the cone-centered basin $a$, is drawn from it into the siphon. This circuitous route of the fluid so described serves to thoroughly break up into small pieces what otherwise should not pass into the sewer-pipe $e$ beyond. It will not, under the tremendous force of the siphon, whose long leg will at times be many feet in length, oppose the passage of anything not entirely foreign to the use and capacity of the sewer $e$, Fig. 1. It will also serve to arrest, convenient for easy removal, the further passage of anything unfit for disposal through such pipe or sewer. The perforations in the annular plate $c$ serve to prevent any confinement of air under its highest interior points. The annular perforated plate $c$ also serves to arrest and retain any floating substance brought by the subsidence of one discharge to the level of the mouth of the siphon until the next siphonage shall take it away in the early part of the flush and follow it by an abundant rush of water. The concentration of the subsiding supply about the mouth of the siphon by the inclination of the sides and bottom of the supply-reservoir, and the effect of the conical rise of the basin $a$, Fig. 1, into the mouth $b$ of the siphon B, serve to effect such a complete siphonage that almost all of the supply will be forcibly drawn up, and, in any event, only a small quantity can be left. This cone-centered basin $a$ thus constructed, in combination with the perforated annular plate $c$ and a siphon, constitutes another valuable feature of my invention. The siphon B embodies several novel features in construction, the most important of which is the inwardly-tapered valve-seat $g$ at the bottom of the short leg for the ball C, so that when the latter is dropped it wedges itself therein, and operates in closing the siphon as a valve, which can only be raised (or opened) when the lifting-pressure of the liquid within the tank can overcome the frictional adhesion of the ball to its seat. The degree of said frictional adhesion will of course vary in proportion to the size of the ball, its weight, the height from which it is dropped, the pitch of the conical valve-seat, and the character of the materials of which the ball and the valve-seat are composed. In some cases it is desirable to employ a valve-seat composed of flexible material—such as vulcanized rubber—and such a seat may be a mere lining; but for obtaining the best results it is, as shown in Fig. 6, secured at the upper and lower edges to a metallic shell, and has an annular recess, $g'$, at its rear, and apertures or ports $g^2$ near its lower edge, so that when the ball is seated water under pressure will enter the apertures, occupy the recess, and compress the lining about the ball, and even above its center, in proportion to the hydrostatic head accumulated, and cause the seat to closely engage with the ball with a much greater area of contact therewith than would be possible if the valve-seat $g$ were a mere flexible or yielding lining; and this peculiar construction of ball-valve seat constitutes in the combination shown another feature of my invention.

The ball C may, as hereinbefore stated, be flotative or non-flotative, and it may be variably constructed. I have obtained good results with a wooden ball, when the latter was first turned dry, then well soaked in water, then turned up again, and so on, until, when finally turned it was pretty fully soaked, and was the less liable thereafter, if kept wet, to depart from a spheroidal form than if turned dry and then wet, in which case the wood would swell unequally. I have also obtained good results with wooden balls inclosed in rubber.

Balls composed in whole or in part of metal, glass, or a composition can also be relied upon for good results, care being taken to provide valve-seats with which such balls can properly engage for securing the desired degree of frictional or adhesive contact and a water-tight joint. Hollow balls containing slightly smaller solid balls in a manner well known can also be used to advantage, whether the hollow balls be composed of flexible or of non-flexible material; and in lieu of the solid interior ball a quantity of shot will serve a good purpose; but I make no claim to any specific construction of the ball. Approximate results may perhaps be secured by the use of an oblate spheroid and a siphon of corresponding interior outline; but I prefer the use of a ball. As before stated, the ball C may be flotative or not, inasmuch as the pressure of the liquid after the release of the ball from its seat may safely be relied upon for lifting the ball out of the short leg and into its raceway above the long leg of the siphon, where, if properly proportioned for the work to be done, it will roll and tumble until siphonage ceases, whereupon it will fall to its seat and resume its function as a valve-cover. The degree of adhesion of the ball to its seat may not be always uniform, and therefore, when hydrostatic pressure is alone relied upon for its release, provision should be made for safely affording the highest possible head or pressure that may be required. In general the specific gravity of the balls used should increase as their diameters diminish. The valve-seat $g$ is a hollow inverted frustum of a cone, as before described, and the inclination of its working-surface will of course be varied according to circumstances. For obtaining the best results said surface should be practically non-corrosive and truly circular. The interior portion of the siphon which is traversed by the ball should be smooth, and, as a rule, coated with or composed of some material which will not unduly roughen by corrosion—as, for instance, it may be enameled, galvanized, or lined with zinc, lead, or bronze; or it may be lined with or composed of earthenware and glazed, or of glass.

Instead of being constructed in several flanged sections, as shown, the siphon above the section containing the valve can be formed in two sections having a longitudinal flanged joint, and this form is especially desirable when earthenware or glass is employed, because of the attendant convenience in molding. The long leg of the siphon should, as a rule, be slightly less in diameter than the short leg. The concave portion of the raceway, as shown, designed to receive the ball during siphonage, affords also by its closely-fitting shape an abrading-surface, available for the scraping of the ball as it turns and revolves during siphonage, and also affords, upon the first violent rise and concussion of the ball, a valuable air and water cushion to resist the shock, while it nowhere affords surplus space from which the air cannot be driven out and effective siphonage secured. The raceway $n$, constructed as shown, enables the ball to roll and tumble freely, but will not allow it to pass away, and after siphonage ceases it will roll to and freely fall into the short leg and resume its frictional contact with its seat.

It will be observed that although the longitudinal line of the raceway $n$ inclines in two directions, its bearing-points diverge from rear to front, as seen in Fig. 10, so that the ball descends as it rolls, and as it advances toward the short leg of the siphon its bearing-contacts are varied from points below and closely adjacent to the vertical center of the ball, as seen in Fig. 12, to points only a little below the horizontal center, as seen in Fig. 15, the intermediate bearing-contacts being illustrated in Figs. 13 and 14. This peculiar construction of the raceway, inclined longitudinally and laterally, constitutes one feature of my invention, and has special value in a siphon, because the ball has a peculiar rolling and shearing action thereon, by which the surface of the ball is kept free from accretions of solid matters, and also because said raceway affords a free passage to the long leg of the siphon and presents no surfaces by which obstructive solid matter can be retained, and this feature is of value whether the ball operates as a flush-valve, or, as heretofore, as a mere seal for resting in a cup at the top of the short leg of a siphon. As seen in Fig. 4, the ball is arranged to be operated solely by hydrostatic pressure—as, for instance, when located at the foot of a house soil-pipe, or at one or more points in a pipe between the foot of such a soil-pipe and a street-sewer. When it is necessary or desirable to regulate and gage flushes either as to quantity or as to time, or both, mechanism for giving the ball its initial movement should be relied upon. As for instance, in Fig. 3, a house water-closet flush-tank is shown, having the usual supply-cock and float for controlling said cock. The siphon B and ball C here shown are as before described; but the ball is set not to start until initially lifted by means of a vertical sliding spindle, $h$, operated by a horizontal lever, $i$, accessible by means of a chain or rod attached to the outer end thereof.

To regulate the operation of flushing or discharging any accumulated supply, and insure siphonage from any desired level, a float, D, is employed, as illustrated in the reservoir, Fig. 1, in which case the lifting-spindle $h$ slides vertically through the conical center of the basin $a$, and in order that it can be accurately adjusted to properly operate against the ball it is constructed in two sections, $h$ and $h'$, Fig. 7, one part being tapped into the other, so that by rotating the upper section, $h$, the spindle may be elongated or shortened, as may be required. A horizontal lever, $i$, is pivoted by a hook and staple at one end below the basin, and is pivotally connected to the lower end of the spindle $h\ h'$, and at its outer end it is connected by a chain to a vertically-sliding rod, $k$, having a float, D, at its upper end. For protecting this lever $i$ from obstructive masses of solid matter it is located within a casing, $m$, which is wholly below the surface of the bottom of the shaft, as seen in Figs. 1 and 5. The float-rod $k$ is housed within a vertical pipe, $k'$, and has a hood, $k^2$, which prevents the undue collection of flotative solid matter around said rod above the top of the pipe $k'$. The float D is vertically adjustable on its rod, whereby the flushing-level can be varied.

It will be seen that the lifting-spindle in no manner obstructs the mouth of the siphon, and that however firmly the ball may be lodged in its seat it will require only the slightest initial movement of it to effect its entire release, and that promptly thereafter the spindle will drop to its lowest position.

To insure freedom of movement by the lifting spindle, it and its guide-bearing in the cone of the basin should be composed of practically non-corrosive metal.

The combination with a valve of any kind in a sewer-flushing apparatus of an incased lever and a float connected thereto for operating the valve-tripping mechanism constitutes another feature of my invention of considerable value, it being obvious that the float will be uniformly able to lift the lever, because the latter is never liable to become obstructed or weighted by solid matters.

With the ball and its valve-seat carefully constructed and proportioned with reference to each other, and a sufficient drop for the ball being provided, it will seldom fail to enable such a head of water to be accumulated as will insure the proper operation of the siphon; but should the ball fail at any time to properly seat itself it can be forced downward by means of a rod inserted through a hole in the cap of the siphon on removing from said hole a tightly-fitting screw-plug, $o$, as illustrated in Fig. 11. It will be seen that even if the ball should fail to be properly seated there will still be a gradual discharge of water through the siphon equal to the supply, and where this carries solids, such as sewage, the ball by resisting the free passage of ordinary solid matters, such as paper, &c., will soon cause a temporary clogging, which when suddenly overcome by pressure of liquid in the tank or pipe will result in the complete lifting of the ball to the raceway, as if it had been forced directly from its valve-seat, and after siphonage ceases the ball will be free to fall and to have a fresh opportunity of properly seating itself. In sewer-shafts I deem it usually advisable to provide a direct outlet at or near the bottom of the shaft, guarded by a suitable valve or gate, and communicating with the sewer, as indicated in dotted lines in Fig. 2, whereby, should occasion demand it, the shaft can be emptied independently of the siphon by the use of a rod and hook for opening the gate.

In the construction of a shaft or reservoir with this improved siphon in the line of any sewer or drain pipe for the purpose of periodically flushing by retention and discharge of the sewage itself, it may be very easily so arranged that the sewage-flow may be diverted without hinderance around the siphon on the regular grade of the sewer, when for any reason it may be desired to do so for inspection of the siphon or any other purpose; or the flushing-shaft may be set just to one side of the sewer and the flow admitted for flushing purposes or turned off by any simple device at pleasure, and the best gate or valve that I know of for effecting this purpose would be a ball or conical plug wedged from the downstream side against the sewage in a conical section of the sewer or pipe placed on the regular grade of the sewer. It could be chained to the shaft and securely wedged to prevent admission of the sewage-flow to the flushing-tank by hand, or could by the use of the chain be withdrawn and hung to one side at will. The economy and value of such a flush to any sewer system, whereby at no extra expense for water the actual sewage contents may at successive intervals be automatically caught and rapidly released, is apparent.

It is obvious that by the use of this siphon the sewage reserve may be accumulated in the sewer itself, filling its entire capacity for a long distance. The efficiency of the flush secured by the sudden release of a quantity of sewage, which completely fills the sewer for a considerable distance, over any system which relies upon the collection of water in tanks of any practicable size, and located at termini only, is obvious. It is particularly advantageous that in soil-pipes, where it will generally be desired to rely wholly upon hydrostatic pressure to start the ball, the supply is usually and frequently delivered behind the ball in a rush or sudden impact, by which its momentum adds to its weight, and consequently its force—as in the sudden emptyings into house-drains of bath-tubs, vats, sinks, basins, and the like, whose contents when released rush violently away.

It is obvious that this siphon can be readily applied to the vaults of outlying privies not provided with heating appliances, where seat-flushing closets cannot be used in cold climates, by retaining and periodically releasing the vault contents to a sewer or cesspool at a lower level, and that it can be used at the mouth of tide-locked sewers and prevent the tide entrance or the sewage escape until a proper time.

To allow the ball to fall freely after siphonage, it is necessary to promptly restore the atmospheric equilibrium within the siphon, even if necessary to provide the air-duct $f$. (Shown in Fig. 1.)

While I prefer the simple form of siphon shown, it is to be understood that I do not preclude myself from employing that other well-known form of siphon which is composed of an inner and an outer pipe, affording an annular space between them.

Having thus described my invention, I claim as new and desire to secure by Letters Patent—

1. The combination, with a siphon, of a tapering valve-seat within the short leg of the siphon, a valve-ball capable of wedging itself into said valve-seat, and an inclined raceway for said ball, extending from the top of the short leg across the top of the long leg of the siphon, substantially as described, whereby said ball operating as a valve is enabled to resist the passage of liquid through the siphon until a sufficient pressure is obtained to force said ball from its seat and lift it to and roll it upon said raceway, and after siphonage ceases enabling said ball to roll downward on its raceway, fall into the short leg of the siphon, and again wedge itself into its valve-seat, as set forth.

2. The combination, with the short leg of a siphon, of a flexible tapered valve-seat, a recess or chamber at the rear of said valve-seat accessible to liquids, and a ball capable of wedging itself in said valve-seat, substantially as described.

3. The combination, with a siphon and a ball, of a raceway for said ball, which extends from the top of the short leg across the top of the long leg of the siphon, and is inclined longitudinally and laterally, substantially as described.

4. The combination of a ball, a tapered valve-seat capable of receiving and frictionally retaining said ball, and a lifting-spindle for releasing said ball from said seat, substantially as described.

5. The combination of a tank or shaft, a ball, a tapered valve-seat capable of receiving and frictionally retaining said ball, a lifting-spindle for said ball, and a float for automatically controlling the spindle, substantially as described.

6. The combination, with a sewer tank or shaft, a siphon, and a cone-centered basin located below the surface of the bottom of the shaft, and containing the mouth of the short leg of the siphon, whereby siphonage can continue until the contents of the tank are practically discharged, but affording a water-seal to the mouth of the siphon.

7. The combination, with a tank or shaft, a siphon, and a cone-centered basin located below the bottom of the shaft, containing the mouth of the siphon, and having an overhanging annular edge, substantially as described.

8. The combination, with a sewer-flushing valve, of a lever for tripping said valve, a casing for inclosing said lever and protecting it from solid matters, and a float for lifting said lever and tripping said valve, substantially as described.

HARVEY C. LOWRIE.

Witnesses:
EDMUND P. MARTIN,
JOHN B. HUNTER.